(12) United States Patent
Conway et al.

(10) Patent No.: US 10,697,282 B2
(45) Date of Patent: *Jun. 30, 2020

(54) METHOD FOR REMEDIATION OF SUBTERRANEAN-FORMED METAL-POLYMER COMPLEXES USING A METAL COMPLEXING AGENT

(71) Applicants: Flex-Chem Holding Company, LLC, Weatherford, OK (US); Cimarex Energy Co., Denver, CO (US)

(72) Inventors: Andrew Bryce Conway, Weatherford, OK (US); Robert Easterly, Tulsa, OK (US)

(73) Assignees: Flex-Chem Holding Company, LLC, Weatherford, OK (US); Cimarex Energy Co, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,464

(22) Filed: Dec. 19, 2018

(65) Prior Publication Data

US 2019/0120037 A1 Apr. 25, 2019

Related U.S. Application Data

(63) Continuation of application No. 14/525,038, filed on Oct. 27, 2014, now Pat. No. 10,202,834.

(Continued)

(51) Int. Cl.
*E21B 43/26* (2006.01)
*C09K 8/52* (2006.01)
*E21B 47/06* (2012.01)

(52) U.S. Cl.
CPC ............. *E21B 43/26* (2013.01); *C09K 8/52* (2013.01); *E21B 47/06* (2013.01)

(58) Field of Classification Search
None
See application file for complete search history.

(56) References Cited

U.S. PATENT DOCUMENTS

| 3,700,280 A | 10/1972 | Papadopolous et al. |
| 4,089,787 A | 5/1978 | Lybarger et al. |

(Continued)

FOREIGN PATENT DOCUMENTS

| EP | 0326720 A1 | 8/1989 |
| EP | 0505169 A1 | 9/1992 |

(Continued)

OTHER PUBLICATIONS

Unconventional Well Testing, Halliburton, retrieved Dec. 16, 2019 from https://www.halliburton.com/en-US/ps/testing-subsea/reservoir-testing-analysis/data-acquisition/spidr/low-permeability-wells.html (Year: 2019).*

(Continued)

*Primary Examiner* — Angela M DiTrani Leff
(74) *Attorney, Agent, or Firm* — Merchant & Gould (57) ABSTRACT

Formulations and methods for remediating subterranean-formed metal-polymer complexes in wells in subterranean formations are described. In one embodiment, the method includes injecting a metal-polymer complex remediation mixture containing a metal complexing agent into a subterranean formation adjacent to a well at a pressure below the fracture pressure of the formation. A sufficient contact time is allowed and then the metal-polymer complex remediation mixture is pumped from the subsurface. This has been shown to remediate polymer-containing, subterranean-formed metal-polymer complexes in shale formations. Without being held to a particular theory, it appears that the metal complexing agent is forming metal complexes with the metals in the complexes, and particularly divalent metal ions. This removal of naturally occurring metals may be (Continued)

un-crosslinking and causing the metal-polymer complexes to go into solution, thereby removing the blockages caused by the metal-polymer complexes.

22 Claims, 8 Drawing Sheets

Related U.S. Application Data (60) Provisional application No. 61/895,873, filed on Oct. 25, 2013, provisional application No. 61/898,107, filed on Oct. 31, 2013.

(56) References Cited

U.S. PATENT DOCUMENTS

| | | | |
|---|---|---|---|
| 4,609,475 A * | 9/1986 | Hanlon | C09K 8/52 166/307 |
| 4,815,537 A | 3/1989 | Jones | |
| 4,986,356 A * | 1/1991 | Lockhart | C09K 8/52 166/300 |
| 5,038,864 A * | 8/1991 | Dunleavy | C09K 8/60 166/300 |
| 5,223,159 A | 6/1993 | Smith et al. | |
| 5,224,546 A | 7/1993 | Smith et al. | |
| 5,346,010 A | 9/1994 | Adams et al. | |
| 5,497,830 A | 3/1996 | Boles | |
| 5,678,632 A * | 10/1997 | Moses | C09K 8/528 166/307 |
| 5,944,446 A | 8/1999 | Hocking | |
| 6,110,875 A | 8/2000 | Tjon-Joe-Pin | |
| 6,162,766 A | 12/2000 | Muir | |
| 6,225,262 B1 | 5/2001 | Irwin | |
| 6,265,355 B1 * | 7/2001 | Lai | C09K 8/528 507/226 |
| 6,331,513 B1 | 12/2001 | Zaid et al. | |
| 6,435,277 B1 | 8/2002 | Qu et al. | |
| 6,436,880 B1 | 8/2002 | Frenier | |
| 6,527,051 B1 | 3/2003 | Reddy et al. | |
| 6,569,814 B1 | 5/2003 | Brady et al. | |
| 6,638,896 B1 | 10/2003 | Tibbles et al. | |
| 7,013,974 B2 | 3/2006 | Hanes, Jr. | |
| 7,159,658 B2 | 1/2007 | Frost et al. | |
| 7,192,908 B2 | 3/2007 | Frenier et al. | |
| 7,208,529 B2 | 4/2007 | Crews | |
| 7,306,041 B2 | 12/2007 | Milne et al. | |
| 7,527,103 B2 | 5/2009 | Huang et al. | |
| 7,906,463 B2 | 3/2011 | Starkey, II et al. | |
| 7,928,040 B2 | 4/2011 | Sanders et al. | |
| 8,071,511 B2 * | 12/2011 | Welton | C09K 8/528 166/311 |
| 8,236,734 B1 | 8/2012 | Shen | |
| 8,312,929 B2 | 11/2012 | Frenier et al. | |
| 8,567,503 B2 | 10/2013 | Welton et al. | |
| 8,567,504 B2 | 10/2013 | Welton et al. | |
| 8,584,757 B2 | 11/2013 | Reyes | |
| 9,932,516 B2 | 4/2018 | Conway | |
| 9,944,843 B2 | 4/2018 | Conway | |
| 10,202,834 B2 * | 2/2019 | Conway | C09K 8/52 |
| 2002/0160920 A1 | 10/2002 | Dawson | |
| 2005/0150520 A1 | 7/2005 | Gill et al. | |
| 2006/0124302 A1 | 6/2006 | Gupta et al. | |
| 2006/0142166 A1 | 6/2006 | Thomas | |
| 2008/0110621 A1 | 5/2008 | Montgomery | |
| 2009/0298721 A1 | 12/2009 | Robb et al. | |
| 2010/0276152 A1 | 11/2010 | De Wolf et al. | |
| 2010/0294498 A1 | 11/2010 | Svoboda et al. | |
| 2011/0053811 A1 * | 3/2011 | Horton | C09K 8/524 507/213 |
| 2011/0214862 A1 | 9/2011 | Horton | |
| 2011/0237470 A1 | 9/2011 | Li et al. | |
| 2011/0263466 A1 | 10/2011 | Rose | |
| 2012/0125626 A1 | 5/2012 | Constantine | |
| 2013/0157905 A1 | 6/2013 | Saini | |
| 2013/0210684 A1 | 8/2013 | Ballard | |
| 2013/0213657 A1 | 8/2013 | Dobson et al. | |
| 2013/0261032 A1 | 10/2013 | Ladva et al. | |
| 2013/0269936 A1 | 10/2013 | Reyes et al. | |
| 2013/0269941 A1 | 10/2013 | Reyes et al. | |
| 2013/0269944 A1 | 10/2013 | Reyes et al. | |
| 2013/0274154 A1 | 10/2013 | Nasr-El-Din et al. | |
| 2013/0274155 A1 | 10/2013 | Nasr-El-Din et al. | |
| 2013/0303412 A1 | 11/2013 | Luyster et al. | |
| 2014/0116696 A1 | 5/2014 | Reyes | |
| 2014/0116710 A1 * | 5/2014 | Naser-El-Din | C09K 8/607 166/308.3 |
| 2014/0124205 A1 | 5/2014 | Nasr-El-Din et al. | |
| 2014/0151042 A1 | 6/2014 | Faugerstrom et al. | |
| 2015/0005204 A1 | 1/2015 | Alwattari | |
| 2015/0114653 A1 | 4/2015 | Conway et al. | |
| 2016/0067845 A1 | 3/2016 | Conway | |
| 2018/0155613 A1 | 6/2018 | Conway | |

FOREIGN PATENT DOCUMENTS

| | | |
|---|---|---|
| EP | 0599474 A2 | 6/1994 |
| WO | 2009086954 A1 | 7/2009 |
| WO | 2009091652 A2 | 7/2009 |
| WO | 2012116032 A1 | 8/2012 |
| WO | 2012171857 A1 | 12/2012 |
| WO | 2013019188 A1 | 2/2013 |
| WO | 2013081609 A1 | 6/2013 |
| WO | 2013173634 A1 | 11/2013 |

OTHER PUBLICATIONS

Rick McCurdy, High Rate Hydraulic Fracturing Additives in Non-Marcellus Unconventional Shales, May 2011, pp. 17-21, Proceedings of the Technical Workshops for the Hydraulic Fracturing Study: Chemical & Analytical Methods http://water.epa.gov/type/groundwater/uic/class2/hydraulicfracturing/upload/proceedingsofhfchemanalmethodsfinalmay2011.pdf.

Jason Weidner, Chemical Additive Selection in Matrix Acidizing, Thesis, May 2011, http://repository.tamu.edu/pitstream/handle/1969.1/150930/Weidner,%20Jason.pdf?sequence=1.

Al-Harthy, et al., Options for High Temperature Well Stimulation, Dec. 1, 2008, Oilfield Review Winter 2008/2009; 20, No. 4, http://www.slb.com/~/media/Files/resources/oilfield_review/ors08/win08/options_for_high_temperature_well_stimulation.pdf.

Portier, et al., Review on Chemical Stimulation Techniques in Oil Industry and Applications to Geothermal Systems—Technical Report, Deep Heat Mining Association, Work Package 4, May 2007, http://engine.brgm.fr/Deliverables/Period2/ENGINE_D28_WP4_ChemicalStimulation_DHMA_052007.pdf.

Xu, et al., On modeling of chemical stimulation of enhanced geothermal system using high pH with chelating agent, Geofluids; Journal vol. 9; Related Information: Journal Publication Date: May 1, 2009; http://www.osti.gov/scitech/servlets/purl/962720.

Waterfront Product Information, Geogard SX—Amorphous Silica Control, 2014, http://www.wateradditives.com/components/com_jshopping/files/demo_products/Geogard_SX_GP_WF.pdf.

Ehsaan Nasir, Thesis for Texas A&M, May 2012, Effect of acid additives on spent acid flowback, http://repository.tamu.edu/bitstream/handle/1969.1/ETD-TAMU-2012-05-10933/NASIR-THESIS.pdf?sequence=2&isAllowed=y.

Frenier, et al., Use of Highly Acid-Soluble Chelating Agents in Well Stimulation Services, SPE Annual Technical Conference and Exhibition, Oct. 1-4, 2000, Dallas, Texas, https://www.onepetro.org/conference-paper/SPE-63242-MS.

Civan et al., Rigorous Modeling of Gas Transport in Nano-darcy Shale Porous Media under Extreme Pore Proximity and Elevated Pressure Conditions, Proceedings of the International Conference on Heat Transfer and Fluid Flow, Prague, Czech Republic, Aug. 11-12, 2014, Paper No. 208, http://avestia.com/HTFF2014_Proceedings/papers/208.pdf.

James Caputo, AAPL 57th Annual Meeting, Boston, Jun. 8-11, 2011, Shale Plays: Basic Geologic and Engineering Concepts, http://www.landman.org/docs/white-papers/03-caputo_aapl_shale_play_seminar_part1_final.pdf.

(56) References Cited

OTHER PUBLICATIONS

Tan Nguyen, New Mexico Tech, Well Design—Spring 2013 Power Point Presentation.
International Search Report for Application No. PCT/US2015/25399 dated Jul. 8, 2015, 2pgs.
Written Opinion of the International Searching Authority for Application No. PCT/US2015/25399 dated Jul. 8, 2015, 5pgs.
Notification of Transmittal of the International Search Report and the Written Opinion of the International Searching Authority, or the Declaration for Application No. PCT/US2015/25399 dated Jul. 8, 2015, 1pg.
Written Opinion, PCT/US2015/048634 dated Dec. 7, 2015, 5pgs.
International Search Report, PCT/US2015/048634 dated Dec. 7, 2015, 2pgs.
Geiver, The Slickwater Story, The Bakken magazine, http://thebakken.com/articles/711/the-slickwater-story, Jul. 14, 2014, 2pgs.
Huang R.Y.M.; Jarvis, N.R. 1973. Ionically crosslinked hydrophilic polymer membranes: Synthesis and measurement of transport properties, J Polym Sci 41: 117-127, 11 pgs.
Ahmed, E.M. 2015. Hydrogel: Preparation, characterization, and applications: A review, J Adv Res 6: 105-121, 17pgs.
Akin, H.; Hasirci, V.N.; Hasirci, N. 1990. Permeability properties of charged hydrogel-carrying membranes, Polymer 31 (2): 270-275, 6pgs.
European Search Report for European Patent Application No. 14856530.2-1354, dated Jun. 23, 2017, 8pgs.
European Search Report dated Aug. 31, 2017, Application No. EP15780712.4, 7pgs.
EPA, Proceedings of the Technical Workshops for the Hydraulic Fracturing Study: Chemical & Analytical Methods, EPA 600/R-11/066, May 2011, 122pgs.
Notification of Transmittal of The International Search Report and The Written Opinion of the International Searching Authority, or the Declaration, PCT/US2014/062440, dated Feb. 13, 2015, 1pg.
Written Opinion of the International Searching Authority, PCT/US2014/062440, dated Feb. 13, 2015, 6pgs.
International Search Report and Written Opinion for Application No. PCT/US2014/062440 dated Feb. 13, 2015.
Australian Examination Report, Application No. 2015247994, dated Feb. 8, 2018, 3 pgs.
Deglint, H.J., et al., "Live Imaging of Micro-Wettability Experiments Performed for Low-Permeability Oil Reservoirs", Scientific Reports, www.nature.com/scientificreports, 7:3247; DOI:10.1038/s41598-017-04239-x; pp. 1-13 Jun. 28, 2017.
Solomon, S. and T. Tlach, "Carbon dioxide (CO2) injection processes and technology", Abstract from Chapter 14.5.1 Permeability in Developments and Innovation in Carbon Dioxide (CO2) Capture and Storage, 2010.
Kuuskraa, V., "Unconventional Natural Gas" Abstract from Advances in Energy Systems and Technology, V. 3, 1982.
Zendehboudi, S., and Alireza Bahadori, "Shale Gas Production Technologies", Abstract from Chapter 4.1 Artificial Well Stimulation, Shale Oil and Gas Handbook, 2017.
Surdam, R.C., et al., "Reducing Risk in Low-Permeability Gas Formations: Understanding the Rock/Fluid Characteristics of Rocky Mountain Laramide Basins", Final Technical Progress Report D.O.E. Award No. DE-FC26-01NT41325 Sep. 20, 2003.
Examination report No. 1 issued in corresponding Australian Application No. 2018219970 dated May 28, 2019; pp. 1-3.
Submission in response to first examination report in corresponding Australian Application dated Jan. 16, 2020; pp. 1-29.
Notice of acceptance for patent application issued in corresponding Australian Application No. 2018219970 dated Jan. 23, 2020; pp. 1-3.

* cited by examiner

METHOD FOR REMEDIATION OF SUBTERRANEAN-FORMED METAL-POLYMER COMPLEXES USING A METAL COMPLEXING AGENT

RELATED APPLICATIONS

This application is a continuation of U.S. patent application Ser. No. 14/525,038 filed Oct. 27, 2014 entitled "Method for Remediation of Subterranean-Formed Metal-Polymer Complexes Using a Metal Complexing Agent", which claims the benefit of U.S. Provisional Application No. 61/895,873, filed Oct. 25, 2013, and U.S. Provisional Application No. 61/898,107, filed Oct. 31, 2013, the contents of all of which are hereby incorporated by reference in their entirety.

INTRODUCTION

The darcy is a unit of permeability for fluids in a porous material. Nano-darcy shale formations refer to those shale formations having an average permeability in at least one direction of less than 1 micro-darcy or less than $1 \times 10^{-6}$ darcy. In nano-darcy shale formations, the range of average pore sizes within the shale spans the size of the hydrocarbons trapped in the shale, e.g., the natural gas molecules and the molecules of the various crude oil constituents. That is, the average pore size within the shale may be smaller, approximately the same size or larger than the size of the hydrocarbons. This differs from higher permeability shale formations in which the average pore sizes are substantially larger than the various hydrocarbon molecule sizes.

While permeability is a useful measurement, the determination of average pore size from a permeability measurement relies on assumptions about the shapes of the grains or pores in the subsurface. Shale formations are a mixture of clay minerals and larger particles. Clay minerals are not normally spherically shaped and also exhibit electro-static properties not found in non-clay materials. Thus, as nano-darcy shale formations are typically very high in clay content, they do not exhibit the same behaviors as more permeable formations, even more permeable shale formations.

Well stimulation refers to the treatment of an existing well to increase its recovery of hydrocarbons or other substances from the subsurface. Because of the different nature of nano-darcy shale formations, typical well stimulation techniques have been found to be ineffective or much less effective than in higher permeability formations.

An extreme form of well stimulation is referred to as hydraulic fracturing. Hydraulic fracturing of oil and gas wells is conducted by pumping fluids at high pressures and high velocities through a vertical and, usually, a horizontal section of a well. The well contains a well casing and, in some wells, tubing inside the casing. Perforations or ports in the casing are adjacent to targeted intervals of subterranean formations containing a hydrocarbon or target product. In hydraulic fracturing, the pressure exerted on the formation is greater than the pressure required to substantially fracture the formation, a pressure referred to as the fracture pressure of the formation which is a function of the formation' properties and the depth where the fractures are desired. One test for determining the fracture pressure is the Leak-off test. Applying a pressure equal to or greater than the fracture pressure causes the formation to fracture, creating an extensive fracture network.

After the fractures or cracks are initiated, pumping is continued, allowing the fractures to propagate. Once the fracture has gained sufficient fracture width, a proppant such as sand is added to the fluid and is transported into the fracture system, partially filling the fracture network. After the desired amount of proppant is placed in the fractures, additional water-based fluid is pumped to flush the casing of any proppant that may have settled in the casing. On completion of the fracturing process, the well is opened, allowing a portion of the fracturing fluids to be recovered. As the pressure is relieved, the fracture closes onto the proppant, creating a conductive pathway needed to accelerate oil and gas recovery from the formation. Hydraulic fracturing is expensive because of the large amounts of fluids and high pressures involved.

Remediating Subterranean-Formed Metal-Polymer Complexes

This disclosure describes formulations and methods for remediating subterranean-formed metal-polymer complexes, such as polyacrylamide or other gelable polymers that crosslink with metal ions, from wells in subterranean formations, including wells in nano-darcy shale formations. In one embodiment, the method includes injecting a remediation mixture containing a metal complexing agent such as citric acid or EDTA into a subterranean formation adjacent to a well at a pressure below the fracture pressure of the formation. A sufficient contact time is allowed and then the remediation mixture is pumped from the subsurface. This has been shown to remediate subterranean-formed polyacrylamide metal-polymer complexes in subterranean formations. Without being held to a particular theory, based on an analysis of samples of polyacrylamide metal-polymer complexes, it appears that the metal complexing agent breaks the cross-links between the cations and the polymers used in the fracturing fluids. The metal-polymer complexes plug the passages in the formations which prevents removal of hydrocarbons. Breaking the crosslinking in the metal-polymer complex causes the metal-polymer complex to go into a solution that can be pumped to the surface, which removes the blockages and thereby causes increased production.

In one aspect, a method for remediating a subterranean-formed metal-polymer complex in a well in a subterranean formation is disclosed. The method can include providing a metal-polymer complex remediation mixture containing between about 0.1% and 95% by weight metal complexing agent, injecting the metal-polymer complex remediation mixture into the well at a pressure less than a fracture pressure of the formation until at least some of the metal-polymer complex remediation mixture contacts the subterranean-formed metal-polymer complex, maintaining the metal-polymer complex remediation mixture in contact with the subterranean-formed metal-polymer complex for a contact time of between about 1 minute and about 100 days, thereby allowing the metal complexing agent to cause the subterranean-formed metal-polymer complex to dissociate and dissolve, thereby creating a low viscosity flow back fluid comprising the spent metal-polymer complex remediation mixture and the metal-polymer complex components; and removing the low viscosity flow back fluid from the well after the contact time, thereby improving the hydrocarbon production of the well relative to the hydrocarbon production immediately prior to performance of the method.

In another aspect, a method for remediating a low-producing well in a subterranean formation is disclosed. The example method can include fracturing the subterranean formation to produce a well, monitoring the production of the well, and after observing the well production decrease, after observing a well production decrease, determining that a subterranean-formed metal-polymer complex has formed in the well. A metal-polymer complex remediation mixture is provided containing between about 0.1% and 95% by weight metal complexing agent. The metal-polymer complex remediation mixture is injected into the well at a pressure less than a fracture pressure of the formation until at least some of the metal-polymer complex remediation mixture contacts the subterranean-formed metal-polymer complex. After injection, the metal-polymer complex remediation mixture is maintained in contact with the subterranean-formed metal-polymer complex for a contact time of between about 1 minute and about 100 days, thereby allowing the metal complexing agent to cause the subterranean-formed metal-polymer complex to dissociate and dissolve, thereby creating a low viscosity flow back fluid comprising the spent metal-polymer complex remediation mixture and the metal-polymer complex components. The low viscosity flow back fluid is then removed from the well after the contact time, thereby improving the hydrocarbon production of the well relative to the hydrocarbon production immediately prior to performance of the method.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the disclosure as claimed.

BRIEF DESCRIPTION OF THE DRAWINGS

The following drawing figures, which form a part of this application, are illustrative of described technology and are not meant to limit the scope of the disclosure as claimed in any manner, which scope shall be based on the claims appended hereto.

DETAILED DESCRIPTION

Although the techniques introduced above and discussed in detail below may be implemented for remediating subterranean-formed metal-polymer complexes from subterranean formations, the present disclosure will discuss the implementation of these techniques in an oil and gas well for the purpose of extracting hydrocarbons. The reader will understand that the technology described in the context of an oil and gas well could be adapted for use with other systems such as water well and solution mining wells.

This disclosure describes formulations and methods for remediating a subterranean-formed metal-polymer complexes with residual polymers such as polyacrylamide or other gelable polymer that forms crosslinks or complexes with metals or metal complexes such as ferric hydroxide. Following the introduction of a hydraulic fracturing fluid, including slickwater, where high volumes of polymers such as polyacrylamide are used as friction reducers, into a well bore, over time the well production can decrease. Previously, well operators assumed that the flow reduction was attributable to the diminishing reserve of hydrocarbons in the subterranean formation. In many instances, this is not the sole reason for the observed flow reduction. Without being bound to a particular theory, the observed flow reduction can be attributed to a build-up of metal-polymer complex in the well bore that was formed after the well was created. Again, without being bound to a particular theory, when fracturing fluid containing a polymer, such as polyacrylamide, is pumped into subterranean formations, the polymer can cross-link with metals present or introduced in the subterranean formations and form metal-polymer complexes. The metal-polymer complex may form a physical block in the subterranean formations, plugging up the conductive pathways formed during the fracturing process.

In one embodiment, the method includes injecting a remediation mixture containing a metal complexing agent such as citric acid or EDTA into a well at a pressure below the fracture pressure of the formation where a metal-polymer complex is presumed or known to have formed. A sufficient contact time is allowed and then the remediation mixture is pumped from the subsurface. The remediation mixture has been shown to un-crosslink and remediate metal-polymer complexes obtained from nano-darcy shale formations, which can result in a liquid with similar viscosity and rheological properties as water. Without being held to a particular theory, based on an analysis of the extracted metal-polymer complex it appears that the metal complexing agent undergoes an ion exchange with the metal-polymer complex causing it to dissociate and dissolve. In other words, the metal complexing agent might be breaking the crosslinks with the cations in the metal-polymer complex.

The present disclosure relates to a process to cause the dissociation of metal cations and metal complexes from the metal-polymer complexes created in wells as a byproduct of the fracturing process. Whether the cations are present from natural sources in the reservoir rock prior to drilling into the formation or formed through interactions with drilling, completion, or reservoir stimulation (hydraulic fracturing or acid stimulation) fluids, the use of metal complexing substances to dissolve or disperse materials that are, or can, restrict flow into the well bore is presented as a commercial method to restore or enhance the productivity of well bores that are restricted with such materials. For example, the introduction of hydraulic fracturing fluids containing, for example, polymers and acrylates including polymers used as friction reducers, such as polyacrylamide, can form metal-polymer complexes between the polymer and the metal ions, such as aluminum, barium, calcium, magnesium, manganese, iron, strontium, boron and other metals or metalloids. These metal-polymer complexes do not exist naturally. Rather, they can form as a result of the fracturing process and the materials used in the fracturing process.

For the purposes of this disclosure, a metal-complexing agent may be any chemical that can bind with a metal regardless of the binding mechanism and includes sequestration agents, reducing agents, chelating agents, ligands, porphyrins, pigments, peptides, saccharides and/or nucleic acids. In some embodiments, the metal-complexing agent is a chelating agent, an alkali metal salt thereof, a non-alkali metal salt thereof, or any combination thereof may be included in the treatment fluids described herein. In some embodiments, the chelating agent may be biodegradable. Although use of a biodegradable chelating agent may be particularly advantageous in some embodiments of the present disclosure, there is no requirement to do so, and, in general, any suitable chelating agent may be used. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life.

In some embodiments, a partially soluble or colloidal metal ion complex, such as, for example, calcium magnesium silicate, is solubilized using, for example, one or a combination of the following chelation chemicals (chelating agent): Acetic Acid, Acrylates, Dihydroxymaleic Acid, Salts of Dihydroxymaleic Acid, EDTA (ethylenediamine tetraacetic acid), Salts of EDTA, erythorbic acid, erythroboric acid, Formic Acid, Gluconodeltalactone, GLDA (glutamic acid N,N-diacetic acid), Salts of GLDA, HEDTA (hydroxyethylenediamine triacetic acid), Salts of HEDTA, HEIDA (disodium ethanoldiglycine), Salts of HEIDA, MGDA (methylglycine N,N-diacetic acid), Salts of MGDA, NTA (nitriolotriacetic acid), Organic Metal Complexers, Phosphonic Acid, Polyacrylic Acid and notably Citric Acid in an amount sufficient to sequester at least a portion of any metal compounds and thereby dissolve or disperse materials that can restrict the flow path to the well bore and the overall permeability of the well bore and reservoir rock system. It should be understood that although chelation chemical(s) (chelating agent(s), chelator(s)) have been provided herein by way of example, any chelation chemical may be utilized in accordance with the present process, so long as the chelation chemical functions in accordance with the present disclosure as described herein.

In some embodiments, suitable complexing agents may include common chelating agent compounds such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, oxalic acid, malonic acid, succinic acid, glutaric acid, adipic acid, pimelic acid, suberic acid, azelaic acid, sebacic acid, phthalic acid, terephthalic acid, aconitic acid, carballylic acid, trimesic acid, isocitric acid, citric acid, any salt thereof, any derivative thereof, and the like. It is to be noted that NTA may be considered to be a biodegradable compound, but it may have undesirable toxicity issues.

In some embodiments, suitable complexing agents may include biodegradable chelating agents such as, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1, 2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1, 2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, any salt thereof, any derivative thereof, or any combination thereof.

In an alternative embodiment, the metal-complexing agent may be a suitable sequestering agent such as polysuccinimide, polyaspartic acid, and polymers, oligomers, chains or block-copolymers of the twenty two essential amino acids containing metal complexing groups such as carboxylic acids, phosphonic acids, sulfonic acids and boronic acids.

In one embodiment, the metal complexing agent is provided between about 0.05% weight volume to about 60% weight volume. However, any suitable range may be used including from about 1% to about 40%; from about 2% and about 20%; from about 0.1% to about 95%; from about 0.05% to about 95%; from about 5% to about 50%; or from about 10% to about 80%. In some embodiments, the amount of metal complexing agent may be even higher as some metal complexing agents may be provided with additives as described in greater detail below.

The metal-polymer complex remediation mixture can contain the metal complexing agent as well as multiple chemical additives as desired. The additives may include biocide, scale inhibitor, clay control additive, oxygen scavenger and surfactant that assist fluid recovery. To keep the fracturing treatments affordable, only minimal amounts of these additives are used. Each additive is normally liquid-based and is metered separately into the treatment fluid and mixed with water and other additives in the blender. The blender includes a 5- to 15-barrel tub with agitation devices. The additive concentrations are commonly expressed in parts per million (ppm) or as gallons of additive per 1000 gallons of water (abbreviated as gallons per thousand or gpt). The additives typically are composed of a chemical that provides the desired function such as scale inhibition and a solvent, commonly water, alcohol or oil.

Another additive that may be used is a corrosion inhibitor. Corrosion inhibitors reduce corrosion of the well components. In an embodiment, quaternary ammonium compounds typically referred to as quaternary amines are used as a corrosion inhibitor in trace amounts to 2,000 ppm. However, any suitable corrosion inhibitor may be used in any amount as desired. Other examples of possible corrosion inhibitors include quaternary amine compounds commonly used for protection of metal in the presence of high or low pH and/or dissolved oxygen bearing fluids, such as Flex-Chem FC-181 and many other similar formulations used in well maintenance activities. Quaternary ammonium compounds, acetylenic alcohols, amide and oxylalkylated alcohols, quinoline quaternary ammonium alkyl amine salts and surfactants, nonyl phenol surfactants, alkyl thioamides, oxyalkylated phenols, alkyl pyridine benzyl quaternary ammonium chloride, benzyl quaternary ammonium chloride, aliphatic amines, cocoamine diquaternary ammonium chloride, imadazoline, polyamide, modified amido polyamine, alkylamidomine, amido imadazoline, alkyl phosphate ester, potassium salt of a glycol phosphate ester, amine salt of poly-phosphate ester, tallow diamine ethoxylate, polyacid, amine salt of polyphosphonic acid, organic acid-amine salt, crude dimerized fatty acids or tall oil dimer-trimer acids.

Another additive that may be used is a surfactant. Surfactants such as sodium lauryl sulfate and many other surfactant materials that could be selected based on their compatibility with the other materials in the chelating solution and pH of the final solution can be used.

Another additive that may be used is a biocide. For example, in an embodiment trace amounts to 5,000 ppm tributyl tetradecyl phosphonium chloride (TTPC) may be used as a biocide. Any suitable biocide may be used in any amount as desired. Biocidal agents could include, glutaraldehyde, quaternary amine compounds such as alkyl dimethyl benzyl ammonium chloride (ADBAC), sodium chlorite (which would generate chlorine dioxide in-situ), TTPC, isothiazolin compounds, thione based compounds, and many other agents approved for use in the well maintenance activities. Other examples of possible biocides include chlorine dioxide, didecyldimethyl ammonium chloride (DDAC) and brominated propionamide.

Another additive that may be used is a dispersing agent. Dispersing agents such as Dow Acumer 5000 or Versaflex Si to enhance the removal of colloidal silicon bearing materials and many other dispersing agents that could assist with recovering colloidal material residue from the well bore.

Another additive that may be used is a colloidal silica deposition inhibitor. The use of a colloidal silica deposition inhibitor, sometimes also referred to as amorphous silica control compound, prevents silica scale precipitation within the wells during the treatment process. One example of a colloidal silica deposition inhibitor is an aqueous solution of organic additive based on phosphino carboxylic acid copolymer. Any suitable colloidal silica deposition inhibitor may be used. Other examples of possible colloidal silica deposition inhibitors include such materials as phosphate, phosphate ester, or phosphonate compounds; polymaleic, or acrylate compounds such as polyacrylic acid scale inhibitors commonly used for such applications in well maintenance activities.

Another additive that may be used is a mutual solvent. Mutual solvents are soluble in oil, water and acid-based mixtures and may be used in a range of applications, such as removing heavy hydrocarbon deposits, controlling the wettability of contact surfaces before, during or after a stimulation treatment, and preventing or breaking emulsions. A commonly used mutual solvent is ethylene glycol monobutyl ether, generally known as EGMBE or 2-butoxy ethanol. Any suitable mutual solvent may be used. Other examples of possible mutual solvents include compounds such as ethylene glycol monobutyl ether or FCS-280 or other compounds commonly used for such applications in well maintenance activities.

Acid may also be used as an additive in order to control the pH of the remediation mixture. In an embodiment hydrochloric acid may be used from trace amounts to about 30% by weight. Any suitable acid may be used as needed. Other examples of possible acids include aqua regia, arsenic acid, boric acid, carbonic acid, chloric acid, chromic acid, fluoroantimonic acid, fluoroboric acid, fluorosulfuric acid, fulminic acid, hexafluorophosphoric acid, hexafluorosilicic acid, hydrobromic acid, hydrofluoric acid, hydrogen iodide, hypochlorous acid, hypofluorous acid, hypophosphoric acid, iodic acid, nitric acid, nitrosyl-O-hydroxide, nitrous acid, orthocarbonic acid, perchloric acid, permanganic acid, perrhenic acid, pertechnetic acid, phosphoric acid, silicic acid, sulfuric acid, thiocyanic acid, titanic acid, tungstic acid or xenic acid.

In some wells, metal-polymer complex remediation using the novel remediation mixtures designed herein may be made more cost efficient by alternating the injection of the remediation mixture with the injection of a diverting material. Many wells have high volume sections within the well flow paths that are referred to as fluid thief zones in that they represent a volume that must be filled during the treatment process but the fluid in that zone is ineffective at its task (in this case complexing with metal cations in the subterranean formation). To address this, a diverting material such as particles of polylactic acid in a brine mixture may be used. Diverting materials are designed to take up larger volumes without interfering with the delivery of treatment chemicals to the target zones. Diverting materials are relatively inert with respect to the treatment chemicals and are also designed to allow easy passage of the treatment chemicals around volumes that they occupy. In addition, many diverting materials are designed to breakdown and be easily recoverable after some period of time such as days or weeks.

Diverting materials and mixtures other than particles of polylactic acid in a brine mixture may also be used. Diverting agents such as benzoic acid flakes, polylactic acid, solid or water soluble ball sealers, rock salt, encapsulated solid chelators, etc., other diverting agents. For example, mixtures using products consisting of various polymers blended with waxes and other solid hydrocarbons polymers blended with waxes and other solid hydrocarbons have been used as diverting material. Diverting materials are designed to be relatively inert with respect to the treatment chemicals and are also designed to allow easy passage of the treatment chemicals.

In an embodiment, a metal-polymer complex remediation program may include alternating between injecting an amount of remediation mixture, followed by injecting an amount of a diverting mixture until such time as the well pressure achieves a target pressure, such as a pre-determined target pressure, the fracture pressure for the formation or a threshold amount above or below the pre-determined fracture pressure from the formation calculated based on the fracture pressure.

Figure 1:
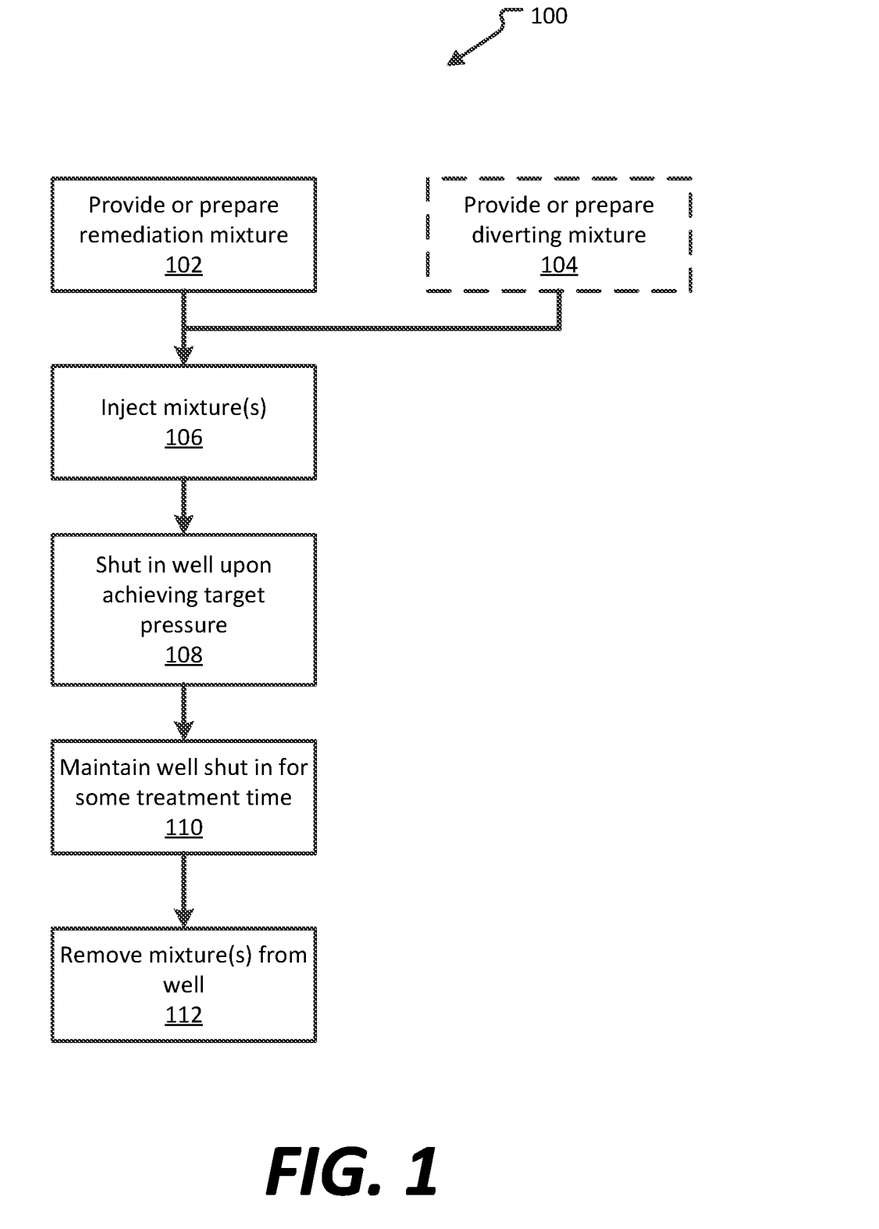
FIG. 1 is an embodiment of a method of remediating a subterranean-formed metal-polymer complex.

FIG. 1 illustrates one such metal-polymer complex remediation program. In the program 100, the remediation mixture is obtained in a provide remediation mixture operation 102. The remediation mixture may be made or completed on site in a batch process or an amount of remediation mixture may be brought to the site prior to the metal-polymer complex remediation of the well. Any of the embodiments of the remediation mixture described above may be used.

In embodiments, a provide diverting mixture operation 104 is also performed in which a diverting mixture is either generated at the site prior to use or a mixture is brought to the site pre-made. Any diverting mixture as described above may be used. This operation, 104, is optional and may not be needed if it is determined that there will be relatively little loses to thief zones of the remediation mixture during the treatment process.

Next, the remediation mixture and the diverting mixture (if any) are injected in an injection operation 106. In an embodiment, the two mixtures are alternately injected in alternating injection operation 106. As described above, predetermined amounts of the mixtures may be alternately injected or the injection amounts may be varied. In an embodiment, for example, the injection operation alternately injects 150 barrels of remediation mixture and 150 barrels of diverting mixture.

In one embodiment, injection continues until such time as the well pressure achieves a target pressure. The target pressure may be a pre-determined target pressure based on knowledge of the operator. Alternatively, the target pressure may be the fracture pressure for the formation or a threshold amount above or below the fracture pressure from the formation. Any suitable technique such as the Leak-off test may be used to determine fracture pressure.

Upon reaching the target pressure, a well shut in operation 108 is performed. In the shut in operation 108, the well is closed and the remediation mixture is trapped in the well.

The well is then maintained in the shut in state in a maintain shut in operation 110. This provides contact time for the remediation mixture allowing the treatment chemicals to react with the subterranean-formed metal-polymer complex, thereby allowing the metal-polymer complex to dissociate and dissolve into the treatment mixture. During this period, the pressure may slowly decrease and the pH may change due to reactions occurring in the subsurface. The contact time provided may be any amount from 1 minute to 100 days. However, it appears that 1 to 4 days may be preferable. Too long or short a contact time may result in lowered performance. Too short a time may not allow sufficient time for the remediation mixture to cause the dissociation of crosslinks and polymer connections in the metal-polymer complex. Too long a contact time may result in bound metals precipitating within the well or formation before they can be removed with the spent remediation mixture. It is anticipated that the optimum time may need to be determined empirically for each fracturing fluid chemistry and formation combination or even each depth or region of a formation.

The method ends with the extraction of the spent remediation mixture along with the dissociated and dissolved metal-polymer complex constituents in a mixture removal operation 112. In the removal operation 112, the well is opened and the liquid in the well is pumped out of the well. The constituents removed will include bound metals from the subsurface, constituents of the metal-polymer complex and spent treatment mixture. Without being held to a particular theory, the remediation mixture breaks up the metal-polymer complex and allows it to be pumped out of the well, whether it is by breaking the cross-links or complexing the metals.

Other embodiments of the method 100 are possible. In addition to changing any of the specific components of the mixtures as described above, changes to when and how the mixtures are produced and injected may be made without departing from the teaching of this disclosure.

Figure 8:
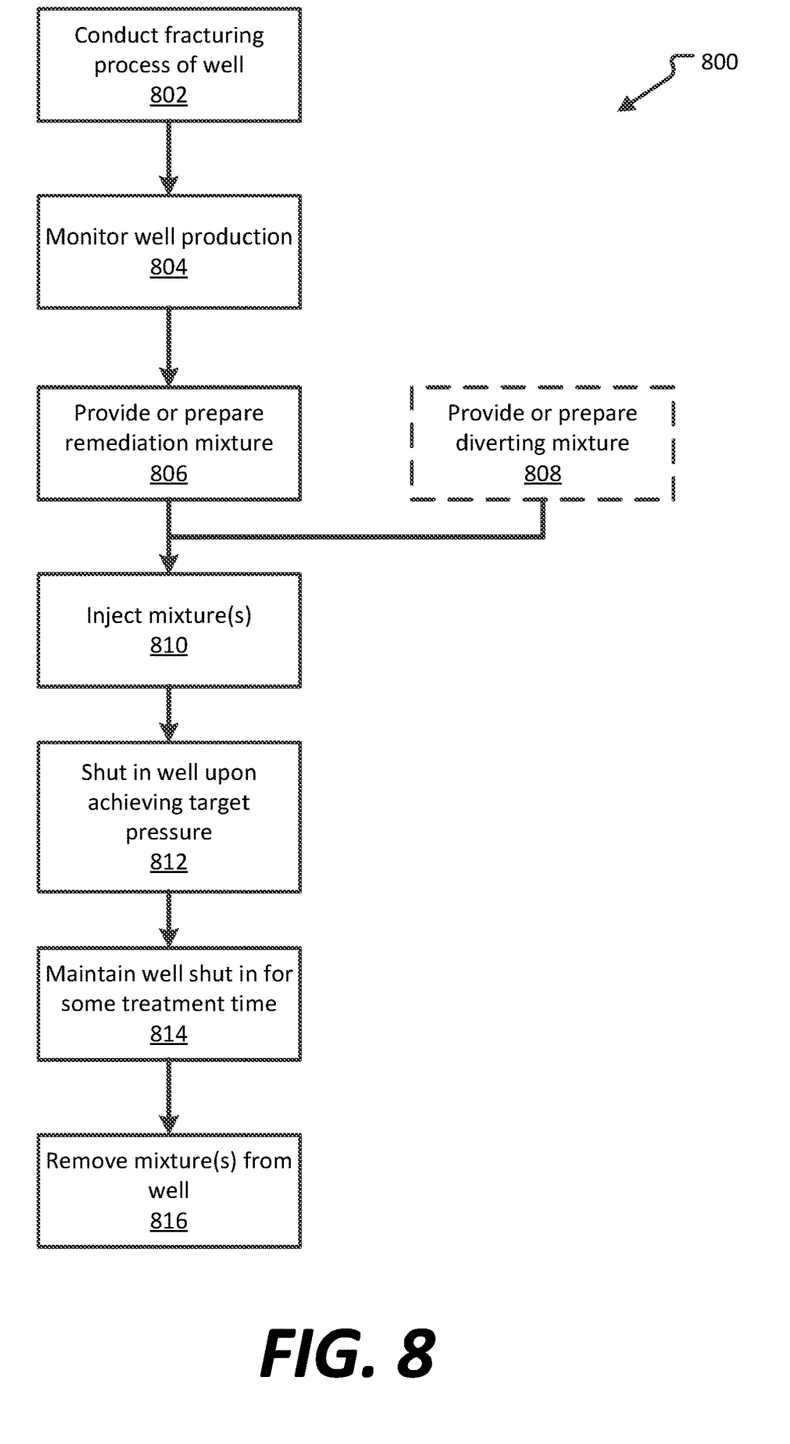
FIG. 8 is an embodiment of a method of remediating a low-producing well.

FIG. 8 illustrates a low-producing well remediation program 800. In some instances, a well becomes low-producing as compared to the initial hydrocarbon production. Without actually testing the well to verify a metal-polymer complex is blocking hydrocarbon flow, there might be a presumption that metal-polymer complex was formed in the well. Nonetheless, remediation mixtures according to the instant disclosure can be employed to improve hydrocarbon production without confirmation that a subterranean-formed metal-polymer complex is the cause of the low hydrocarbon production. Embodiments of this method may be usable with any fractured well regardless of the permeability of the formation. However, such embodiment may be more suitable for low permeability formations such as nano-darcy formations as the development of a metal-polymer complex will have a greater impact in a low permeability formation than in a higher permeability formation.

In the example program 800, a well is fractured using fracturing fluid in a conduct fracturing process operation 802. This process is performed according to various methods known in the art. In embodiments, the well production output is monitored in operation 804. Monitoring output can include hourly, daily, weekly, monthly, and yearly hydrocarbon output from the well. It can be performed manually or automatically. If the well production decreases, then a remediation of the well can be performed using a remediation mixture. The monitoring operation 804 may include periodic sampling from the well to determine the existence of a subterranean-formed metal-polymer complex. Determination of a metal-polymer complex in this embodiment is direct observation of the metal-polymer complex such as by obtaining some amount of material from the well (e.g., via a bailer, by a downhole inspection technique, or from the flowback). If a decrease in well production is observed in tandem with the existence of a subterranean-formed metal-polymer complex or an increase in the amount of metal-polymer complex observed in the well, then it will be presumed that the metal-polymer complex is causing the production decrease. Alternatively, the monitoring operation 804 may only be a monitoring of the hydrocarbon production of the well, the flowback production of the well, the pressures needed to operate the well or some other indicator of well performance or of the hydraulic resistance within the well. In this embodiment, the observed decrease in performance in conjunction with the fact that a fracturing operation took place at the well is indirect evidence that a metal-polymer complex has formed and is causing the decrease in performance.

The remediation mixture is obtained in a provide remediation mixture operation 806. The remediation mixture may be made or completed on site in a batch process or an amount of remediation mixture may be brought to the site prior to the metal-polymer complex remediation of the well. Any of the embodiments of the remediation mixture described above may be used.

In embodiments, a provide diverting mixture operation 808 is also performed in which a diverting mixture is either generated at the site prior to use or a mixture is brought to the site pre-made. Any diverting mixture as described above may be used. This operation, 808, is optional and may not be needed if it is determined that there will be relatively little loses to thief zones of the remediation mixture during the treatment process.

Next, the remediation mixture and the diverting mixture (if any) are injected in an injection operation 810. In an embodiment, the two mixtures are alternately injected in alternating injection operation 810. As described above, predetermined amounts of the mixtures may be alternately injected or the injection amounts may be varied. In an embodiment, for example, the injection operation alternately injects 150 barrels of remediation mixture and 150 barrels of diverting mixture.

In one embodiment, injection continues until such time as the well pressure achieves a target pressure. The target pressure may be a pre-determined target pressure based on knowledge of the operator. Alternatively, the target pressure may be the fracture pressure for the formation or a threshold amount above or below the fracture pressure from the formation. Any suitable technique such as the Leak-off test may be used to determine fracture pressure.

Upon reaching the target pressure, a well shut in operation 812 is performed. In the shut in operation 812, the well is closed and the remediation mixture is trapped in the well.

The well is then maintained in the shut in state in a maintain shut in operation 814. This provides contact time for the remediation mixture, allowing the treatment chemicals to react with the presumed subterranean-formed metal-polymer complex, thereby allowing the metal-polymer complex to dissociate and dissolve into the treatment mixture. During this period, the pressure may slowly decrease and the pH may change due to reactions occurring in the subsurface. The contact time provided may be any amount from 1 minute to 800 days. However, it appears that 1 to 4 days may be preferable. Too long or short a contact time may result in lowered performance. Too short a time may not allow sufficient time for the remediation mixture to cause the dissociation of crosslinks and polymer connections in the metal-polymer complex. Too long a contact time may result in bound metals precipitating within the well or formation before they can be removed with the spent remediation mixture. It is anticipated that the optimum time may need to be determined empirically for each fracturing fluid chemistry and formation combination or even each depth or region of a formation.

The method ends with the extraction of the spent remediation mixture along with the dissociated and dissolved metal-polymer complex constituents in a mixture removal operation 816. In the removal operation 816, the well is opened and the liquid in the well is pumped out of the well. The constituents removed may include bound metals, constituents of the metal-polymer complex and spent treatment mixture. Without being held to a particular theory, the remediation mixture breaks up the metal-polymer complex and allows it to be pumped out of the well, whether it is by breaking the cross-links or complexing the metals.

Other embodiments of the method 800 are possible. In addition to changing any of the specific components of the mixtures as described above, changes to when and how the mixtures are produced and injected may be made without departing from the teaching of this disclosure.

EXAMPLES

Example 1

Figure 2A:
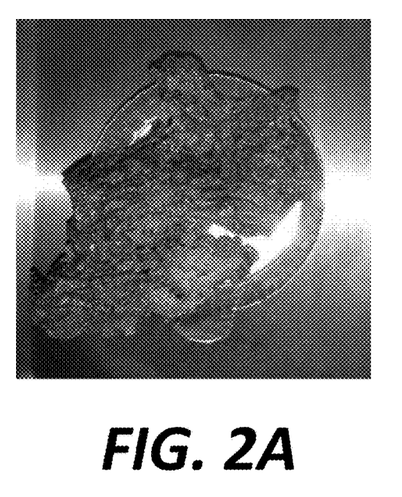
FIG. 2A illustrates a sample of a subterranean-formed metal-polymer complex.
Figure 2B:
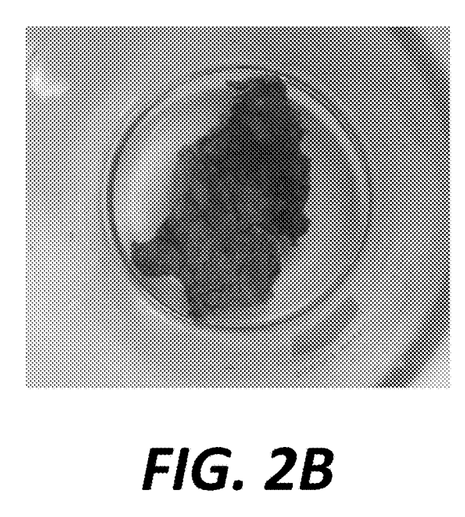
FIG. 2B illustrates the sample of FIG. 2A in a beaker with an example remediation mixture.
Figure 2C:
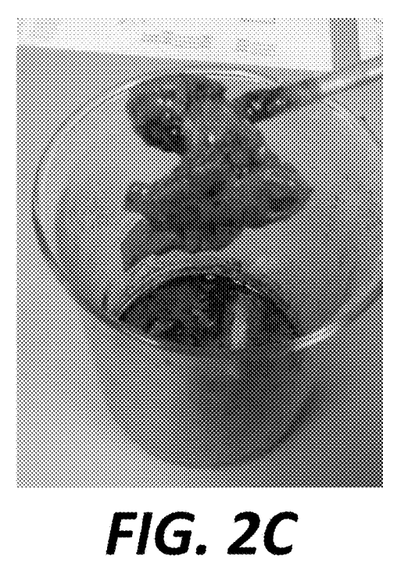
FIGS. 2C and 2D illustrate the sample of FIG. 2B after contact with the example remediation mixture in FIG. 2B.
Figure 2D:
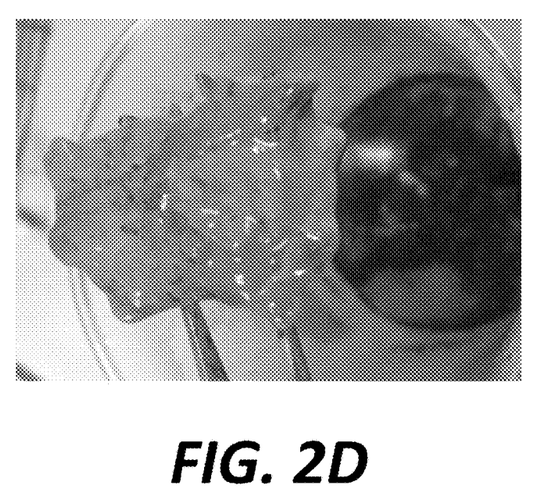

A laboratory analysis was performed in which embodiments of the remediation mixture were mixed with a sample of subterranean-formed metal-complexed polyacrylamide metal-polymer complex. In the first test, 14.2 g of a sample was weighed (see FIG. 2A). The sample was placed into a 500 mL Griffin Beaker (FIG. 2B) with 8 mL d-limonene and 40 mL of 10% sodium chlorite. The sample was then placed in a 150° F. water bath for 16 hours. After 16 hours, the sample was observed (FIGS. 2C and 2D).

The initial d-limonene treatment appeared to release a trace amount of hydrocarbon in the metal-polymer complex sample. After the sample soaked for 16 hours in 10% sodium chlorite at 150° F. (FIGS. 2C and 2D), there was a change to the sample.

Figure 3:
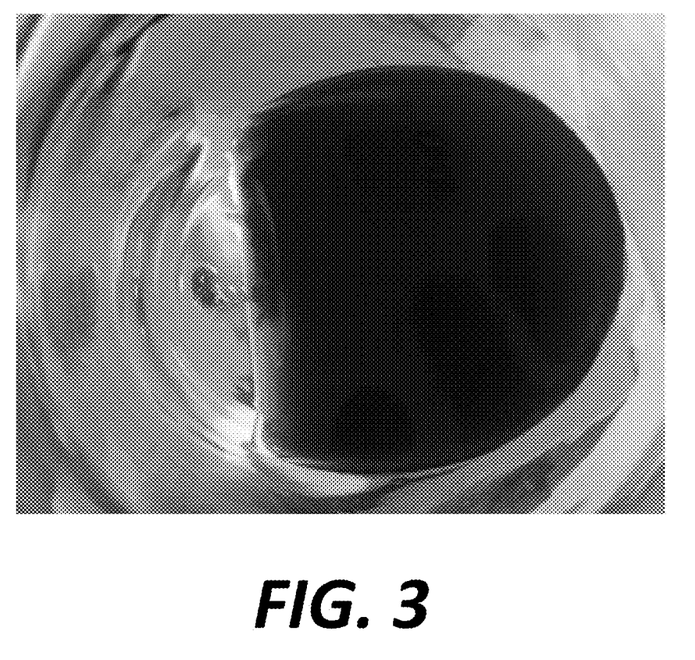
FIG. 3 illustrates a sample of a subterranean-formed metal-polymer complex after contact with an example remediation mixture.

In the second test, 18.7 g of a sample of subterranean-formed metal-polymer complex was weighed. The sample was placed in a 300 mL Griffin Beaker with 40 mL of 10% tetrasodium EDTA. The sample was placed in a 150° F. water bath for 16 hours. After 16 hours, the sample was observed (FIG. 3).

The addition of 10% tetrasodium EDTA to the sample put the sample completely into solution after 4 hours at 150° F. (FIG. 3). Without being bound to a particular theory, it appears that the tetrasodium EDTA and the metal-polymer complex sample have an ion exchange that causes the metal-polymer complex sample to dissociate and dissolve.

Figure 4A:
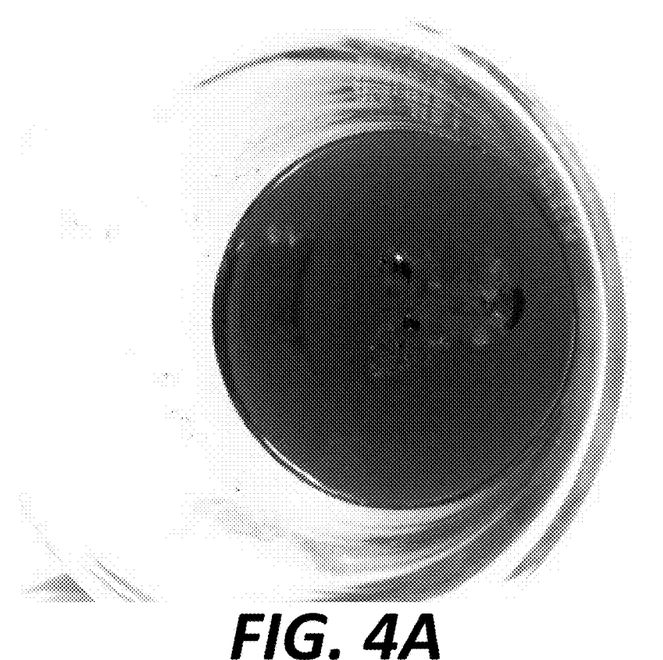
FIGS. 4A and 4B illustrate a sample of a subterranean-formed metal-polymer complex after contact with an example remediation mixture.
Figure 4B:
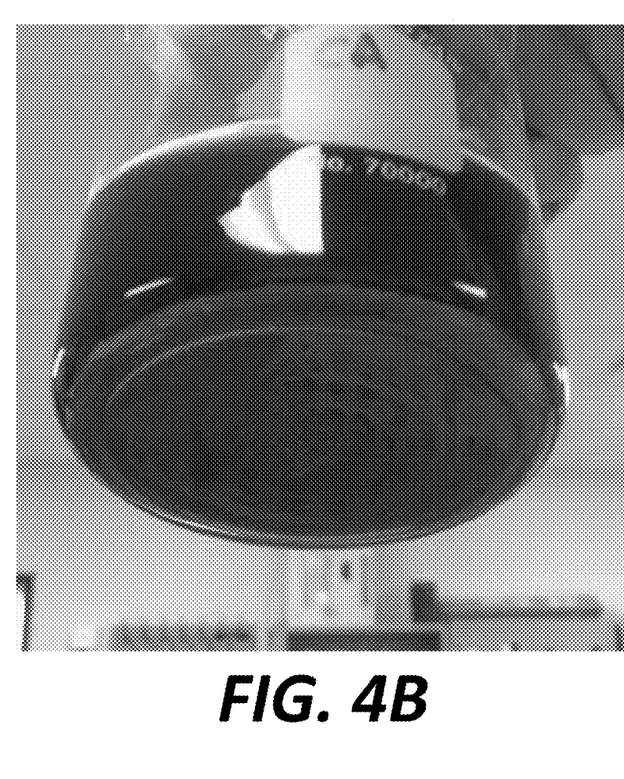

In the third test, 14.4 g of a sample of subterranean-formed metal-polymer complex was weighed. The sample was placed in a 300 mL Griffin Beaker with 80 mL of 10% citric acid. The sample was then placed in a 150° F. water bath for 16 hours. After 16 hours, the sample was observed (FIGS. 4A and 4B).

The addition of 10% citric acid to the sample subterranean-formed metal-polymer complex moderately put the sample of subterranean-formed metal-polymer complex into solution after 16 hours at 150° F. (FIGS. 4A and 4B).

Example 2

Figure 5A:
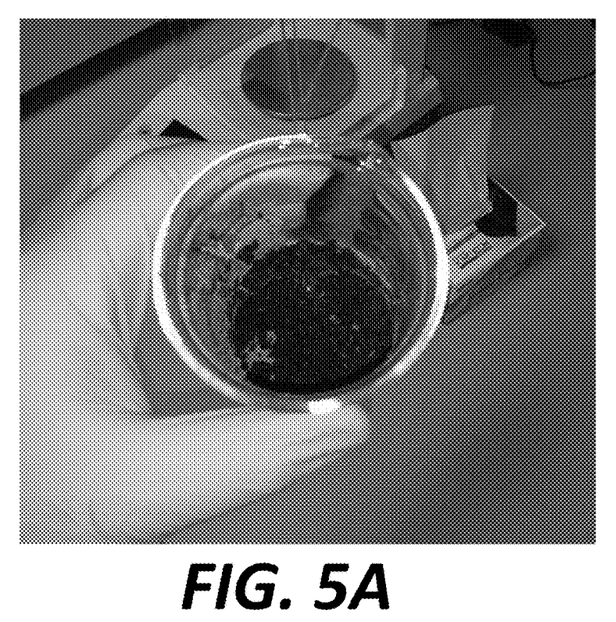
FIG. 5A illustrates a sample of a subterranean-formed metal-polymer complex.
Figure 5B:
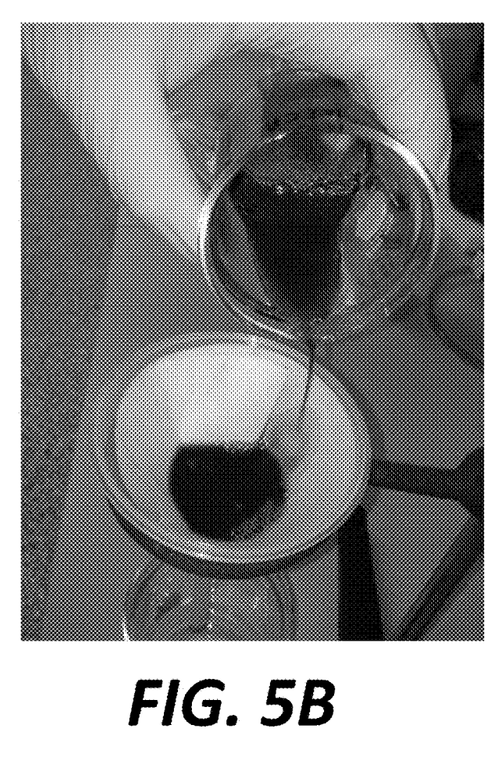
FIG. 5B illustrates the sample of 5A being filtered after contact with an example remediation mixture.

A laboratory analysis was performed in which embodiments of the remediation mixture were mixed with a sample subterranean-formed metal-complexed polyacrylamide metal-polymer complex. In the first test, 21.6 g of a sample subterranean-formed metal-polymer complex was weighed (FIG. 5A). Then the sample was placed in a 250 mL Griffin Beaker with 40 mL of 10% citric acid. The sample was then placed in a 178° F. water bath for 18 hours. After 18 hours, the sample was filtered and observed (FIG. 5B).

Citric acid is a weak organic acid that is also a metal complexing agent. The addition of 10% citric acid to the sample moderately put the sample into solution after 18 hours at 178° F. (FIG. 5B). The filtrate and the frac sand appeared to have no binding polymer residue.

Figure 6A:
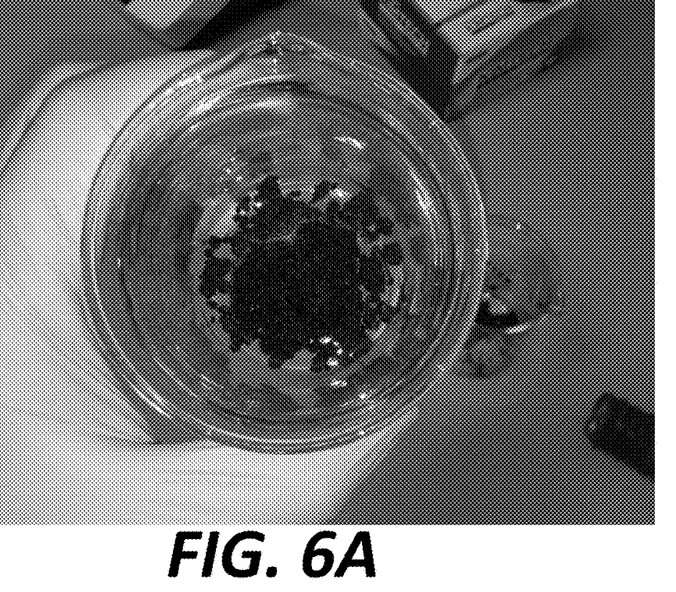
FIG. 6A illustrates a sample of a subterranean-formed metal-polymer complex.
Figure 6B:
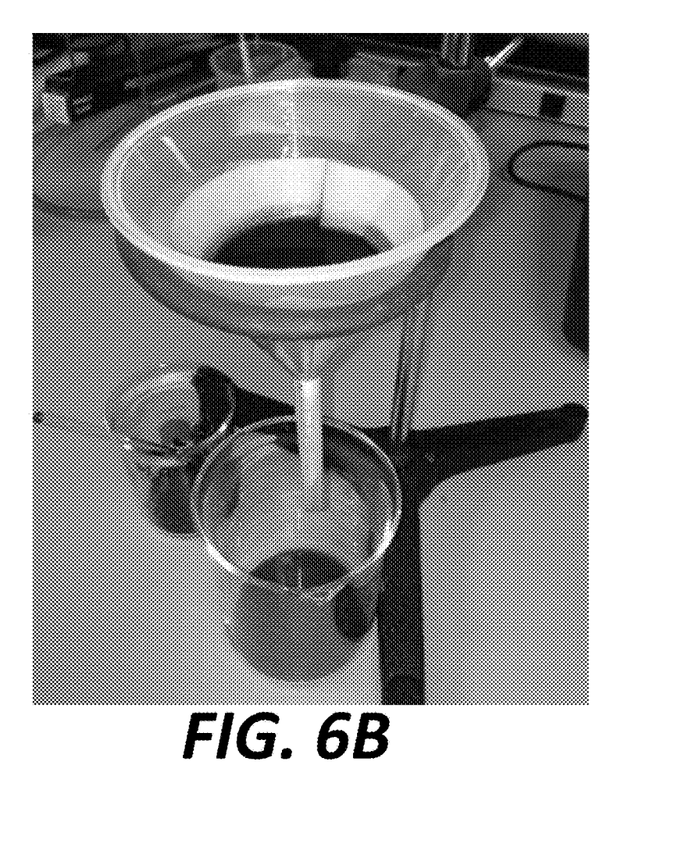
FIG. 6B illustrates the sample of 6A being filtered after contact with an example remediation mixture.

In the second test, 21.6 g of a sample of subterranean-formed metal-polymer complex was weighed (FIG. 6A). The sample was placed in a 250 mL Griffin Beaker with 40 mL of 10% tetrasodium EDTA. Then the sample was placed in a 178° F. water bath for 18 hours. After 18 hours, the sample was filtered and observed (FIG. 6B).

The addition of 10% tetrasodium EDTA to the metal-polymer complex sample moderately put the sample into solution after 16 hours at 178° F. (FIG. 6B). Without wishing to be bound to a particular theory, it appears that after being bound by tetrasodium EDTA, the metal ions originally in the metal-polymer complex sample remain in solution but exhibit diminished reactivity. This could be attributed to the tetrasodium EDTA uncrosslinking the metal-polymer complex sample by undergoing ion exchange, resulting in dissociation and dissolution. The filtrate and remaining frac sand in the sample separated out but had a polymer binding sludge-coated appearance.

Figure 7A:
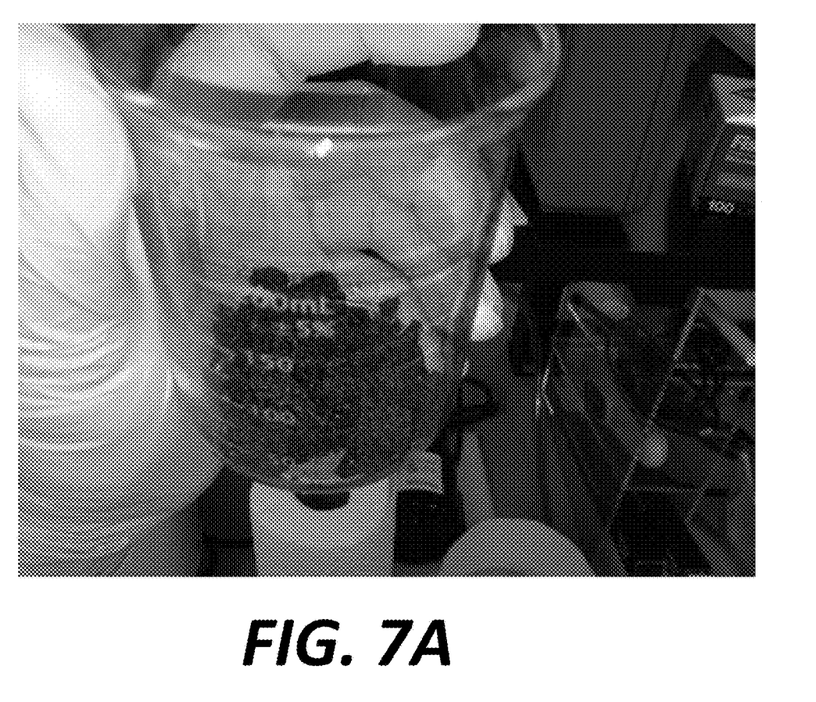
FIG. 7A illustrates a sample of a subterranean-formed metal-polymer complex.
Figure 7B:
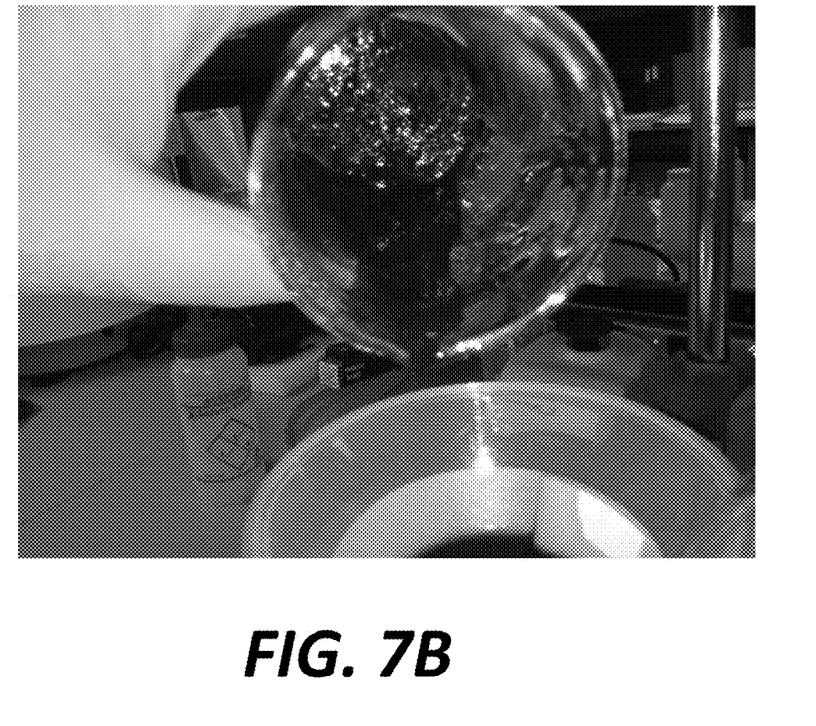
FIG. 7B illustrates the sample of 7A being filtered after contact with an example remediation mixture.

In the third test, 21.6 g of a sample of subterranean-formed metal-polymer complex was weighed (FIG. 7A). The sample was placed in a 250 mL Griffin Beaker with 40 mL of 5% citric acid/5% tetrasodium EDTA solution. Then the sample was placed in a 178° F. water bath for 18 hours. After 18 hours, the sample was filtered and observed (FIG. 7B).

The addition of 5% citric acid/5% tetrasodium EDTA solution to the metal-polymer complex sample moderately put the sample into solution after 18 hours at 178° F. (FIG. 7B). The filtrate and remaining frac sand in the sample separated out.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure.

What is claimed is:

1. A method for remediating a subterranean-formed metal-polymer complex in a pre-existing well in a subterranean shale formation, the method comprising:
   providing a metal-polymer complex remediation mixture comprising between 0.1% and 95% by weight metal complexing agent;
   injecting the metal-polymer complex remediation mixture into the well at a pressure less than a fracture pressure of the subterranean formation until at least some of the metal-polymer complex remediation mixture contacts the subterranean-formed metal-polymer complex, wherein the subterranean-formed metal polymer complex forms from a previously injected fracturing fluid and the metal of the subterranean-formed metal-polymer complex includes metal naturally present within the subterranean formation;
   maintaining the metal-polymer complex remediation mixture in contact with the subterranean-formed metal-polymer complex for a contact time of between about 1 minute and about 100 days, thereby allowing the metal complexing agent to cause the subterranean-formed metal-polymer complex to dissociate and dissolve but not precipitate the metal and thereby creating a low viscosity flow back fluid comprising the spent metal-polymer complex remediation mixture and the metal-polymer complex components; and
   removing the low viscosity flow back fluid from the well after the contact time, thereby improving hydrocarbon production of the well.

2. The method of claim 1, wherein the metal complexing agent is citric acid, formic acid, or mixtures thereof.

3. The method of claim 1, wherein the metal complexing agent is selected from the group consisting of ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, oxalic acid, malonic acid, succinic acid, glutaric acid, adipic acid, pimelic acid, suberic acid, azelaic acid, sebacic acid, phthalic acid, terephthalic acid, aconitic acid, carballylic acid, trimesic acid, isocitric acid, citric acid, salts thereof, and mixtures thereof.

4. The method of claim 1, further wherein the metal complexing agent is selected from the group consisting of glutamic acid diacetic acid (GLDA), methylglycine diacetic acid (MGDA), β-alanine diacetic acid (β-ADA), ethylenediaminedisuccinic acid, S,S-ethylenediaminedi succinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N''-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, salts thereof, and mixtures thereof.

5. The method of claim 1, further wherein the metal complexing agent is selected from acetic acid, acrylates, dihydroxymaleic acid, salts of dihydroxymaleic acid, ethylenediamine tetraacetic acid (EDTA), salts of EDTA, erythorbic acid, erythroboric acid, formic acid, gluconodeltalactone, glutamic acid N,N-diacetic acid (GLDA), salts of GLDA, hydroxyethylenediamine triacetic acid (HEDTA), salts of HEDTA, disodium ethanoldiglycine (HEIDA), salts of HEIDA, methylglycine N,N-diacetic acid (MGDA), salts of MGDA, nitriolotriacetic acid (NTA), and mixtures thereof.

6. The method of claim 1, wherein the metal-polymer complex remediation mixture comprises between 10% and 80% by weight metal complexing agent, one or more additives, and mutual solvent.

7. The method of claim 6, wherein the metal complexing agent comprises between 10% and 80% by weight citric acid, formic acid, or mixtures thereof, between 0.1 and 30% of one or more acids as a pH modifier, and mutual solvent.

8. The method of claim 1, wherein the metal-polymer complex remediation mixture comprises between 0.1% and about 60% by weight metal complexing agent.

9. The method of claim 1, wherein the metal-polymer complex remediation mixture further comprises a mutual solvent and an additive selected from the group consisting of acid inhibitor, corrosion inhibitor, scale inhibitor, clay control additive, surfactant, biocide, and mixtures thereof.

10. The method of claim 1, wherein the metal-polymer complex remediation mixture comprises:
between 1% and 95% by weight metal complexing agent;
between 1 and 10,000 parts per million (ppm) of a corrosion inhibitor;
between 1 and 10,000 ppm of a biocide;
between 1 and 10,000 ppm of-a colloidal silica deposition inhibitor; and
between 1 and 500 gallons mutual solvent per thousand gallons (gpt) of water.

11. The method of claim 1, wherein the metal-polymer complex remediation mixture further comprises a pH modifier.

12. The method of claim 11, wherein the metal-polymer complex remediation mixture further comprises between 0.1 and 30% of one or more acids as a pH modifier.

13. The method of claim 12, wherein the acid is selected from the group consisting of hydrochloric acid, aqua regia, arsenic acid, boric acid, carbonic acid, chloric acid, chromic acid, fluoroantimonic acid, fluoroboric acid, fluorosulfuric acid, fulminic acid, hexafluorophosphoric acid, hexafluorosilicic acid, hydrobromic acid, hydrofluoric acid, hydrogen iodide, hypochlorous acid, hypofluorous acid, hypophosphoric acid, iodic acid, nitric acid, nitrosyl-O-hydroxide, nitrous acid, orthocarbonic acid, perchloric acid, permanganic acid, perrhenic acid, pertechnetic acid, phosphoric acid, silicic acid, sulfuric acid, thiocyanic acid, titanic acid, tungstic acid, xenic acid, and mixtures thereof.

14. The method of claim 12, wherein the acid is hydrochloric acid.

15. The method of claim 1, wherein the injecting operation further comprises:
alternately injecting a first amount of metal-polymer complex remediation mixture and a second amount of a diverting mixture into the well.

16. The method of claim 1, wherein the injecting operation further comprises:
injecting the metal-polymer complex remediation mixture until pressure within the well reaches a predetermined target that does not cause substantial fracturing of the formation.

17. The method of claim 1, wherein the injecting operation further comprises:
injecting the metal-polymer complex remediation mixture until the pressure within the well reaches a predetermined target pressure calculated based on the fracture pressure of the subterranean formation; and
upon reaching the target pressure, shutting in the well.

18. The method of claim 1 further comprising:
monitoring at least one of pH and well pressure during the maintaining operation; and
initiating the removing operation based on results of the monitoring operation.

19. The method of claim 1, wherein the contact time is between about 4 hours and about 4 days.

20. The method of claim 19, wherein the contact time is between 1 to 4 days.

21. A method for remediating a subterranean-formed metal-polymer complex in an existing, low-producing well in a hydrocarbon-bearing subterranean shale formation, comprising:
observing a well production decrease;
providing a metal-polymer complex remediation mixture containing between 1% and 95% by weight metal complexing agent;
injecting the metal-polymer complex remediation mixture into the well at a pressure less than a fracture pressure of the subterranean shale formation until at least some of the metal-polymer complex remediation mixture contacts the subterranean-formed metal-polymer complex, wherein the subterranean-formed metal polymer complex forms from a previously injected fracturing fluid and the metal of the subterranean-formed metal-polymer complex includes metal naturally present within the subterranean formation;

maintaining the metal-polymer complex remediation mixture in contact with the subterranean-formed metal-polymer complex for a contact time of between about 1 minute and about 100 days, thereby allowing the metal complexing agent to cause the subterranean-formed metal-polymer complex to dissociate and dissolve, thereby creating a low viscosity flow back fluid comprising the spent metal-polymer complex remediation mixture and the metal-polymer complex components; and removing the low viscosity flow back fluid from the well after the contact time, thereby improving the hydrocarbon production of the well relative to the hydrocarbon production immediately prior to performance of the method.

22. The method of claim 21, wherein the injecting operation further comprises:

alternately injecting a first amount of metal-polymer complex remediation mixture and a second amount of a diverting mixture into the well.

* * * * *

UNITED STATES PATENT AND TRADEMARK OFFICE
CERTIFICATE OF CORRECTION

PATENT NO. : 10,697,282 B2
APPLICATION NO. : 16/226464
DATED : June 30, 2020
INVENTOR(S) : Andrew Bryce Conway and Robert Easterly Page 1 of 1

It is certified that error appears in the above-identified patent and that said Letters Patent is hereby corrected as shown below:

In the Claims

Claim 4, Column 15, Line 25, N,N"-disuccinic acid should read --N,N'-disuccinic acid--

Signed and Sealed this
Third Day of November, 2020

Andrei Iancu
*Director of the United States Patent and Trademark Office*